United States Patent
Ferdinand

(10) Patent No.: US 12,309,013 B2
(45) Date of Patent: May 20, 2025

(54) SYSTEMS AND METHODS FOR UTILIZING PHASE CONTINUITY FOR GENERATING WAVEFORMS WITH LOW PEAK-TO-AVERAGE POWER RATIO

(71) Applicant: Samsung Electronics Company, Ltd., Suwon-si (KR)

(72) Inventor: Nuwan Suresh Ferdinand, Stittsville (CA)

(73) Assignee: Samsung Electronics Company, Ltd., Suwon (KR)

( * ) Notice: Subject to any disclaimer, the term of this patent is extended or adjusted under 35 U.S.C. 154(b) by 77 days.

(21) Appl. No.: 18/485,938

(22) Filed: Oct. 12, 2023

(65) Prior Publication Data
US 2025/0126008 A1    Apr. 17, 2025

(51) Int. Cl.
*H04L 27/26* (2006.01)
*H04L 25/03* (2006.01)

(52) U.S. Cl.
CPC ...... *H04L 27/263* (2013.01); *H04L 25/03312* (2013.01); *H04L 27/2618* (2013.01)

(58) Field of Classification Search
CPC ... H04L 27/26; H04L 27/263; H04L 27/2628; H04L 27/2634; H04L 27/2636; H04L 27/2602; H04L 27/2605; H04L 27/2617; H04L 27/2618; H04L 27/262; H04L 27/2621; H04L 27/2614; H04L 25/03312; H04L 25/03343; H04L 2025/0335
See application file for complete search history.

(56) References Cited

U.S. PATENT DOCUMENTS

| | | | |
|---|---|---|---|
| 12,003,350 B1 * | 6/2024 | McCormick | H04B 7/18517 |
| 2008/0253349 A1 | 10/2008 | Yu | |
| 2020/0212943 A1 | 7/2020 | Banin | |
| 2021/0143822 A1 * | 5/2021 | Wu | G11C 16/32 |
| 2024/0340210 A1 * | 10/2024 | Hua | H04L 27/2617 |

FOREIGN PATENT DOCUMENTS

| | | |
|---|---|---|
| CN | 1602010 A | 3/2005 |
| EP | 1123610 B1 | 1/2010 |
| KR | 20090001277 A | 1/2009 |

OTHER PUBLICATIONS

International search report and Written Opinion received for PCT Application No. PCT/KR2024/000037, mailed Jun. 28, 2024, 7 pages.

* cited by examiner

*Primary Examiner* — Khanh C Tran
(74) *Attorney, Agent, or Firm* — Baker Botts L.L.P.

(57) ABSTRACT

In one embodiment, a method includes accessing a modulated symbol sequence comprising multiple symbols, generating interpolated symbols to be added between any two adjacent symbols based on an unequal phase change method, generating an interpolated symbol sequence based on adding the generated interpolated symbols for any two adjacent symbols into the two adjacent symbols, and transmitting a waveform to a wireless endpoint device, wherein the waveform is generated based on the interpolated symbol sequence.

20 Claims, 11 Drawing Sheets

SYSTEMS AND METHODS FOR UTILIZING PHASE CONTINUITY FOR GENERATING WAVEFORMS WITH LOW PEAK-TO-AVERAGE POWER RATIO

TECHNICAL FIELD

This disclosure relates generally to wireless communications, and in particular relates to systems and methods for efficient wireless communications.

BACKGROUND

Energy efficiency is an important consideration on future wireless standards. One approach to achieve energy efficiency in communication networks is to improve the power amplifier efficiency. Peak-to-average power ratio (PAPR) plays an important role in power amplifier efficiency. Higher PAPR significantly impacts the power amplifier efficiency and therefore reduction of PAPR plays an important role in improving overall energy efficiency.

The waveform design may primarily determine the PAPR of the signal. In the current 5G New Radio (NR) wireless standards, orthogonal frequency division multiplexing (OFDM) is used as the main waveform, which may have significantly higher PAPR, therefore causing power amplifier inefficiencies. Further, for the uplink transmission, the current 5G NR allows the use of discrete Fourier transform-spread-OFDM (DFT-s-OFDM) as a waveform candidate. While DFT-s-OFDM has lower PAPR in comparison to OFDM, the PAPR of DFT-s-OFDM may be still too high for future wireless standards. As future wireless standards are expected to use higher carrier frequencies, the PAPR becomes even a bigger problem for power amplifier design.

Therefore, the low PAPR waveform design may be of great importance for future wireless standards. Typically, reduction of PAPR is not free and something needs to be sacrificed or there is a trade-off. The trade-off can be PAPR versus spectral efficiency, PAPR versus complexity, or PAPR versus poor error performance. As an example, frequency domain spectral shaping with the combination of bandwidth extension may reduce the PAPR. This approach may result in spectral efficiency loss, therefore creating a trade-off of PAPR versus spectral efficiency loss. There are other techniques that propose solutions to reduce PAPR with the cost of inter symbol interference (ISI), therefore resulting poor error performance. One such approach is the introduction of additional symbols in time domain to increase the phase continuity and filter in frequency domain to retain the desired bandwidth. As this approach transmits signals faster than Nyquist rate, it may create ISI and therefore result in poor error performance.

DESCRIPTION OF EXAMPLE EMBODIMENTS

Figure 1:
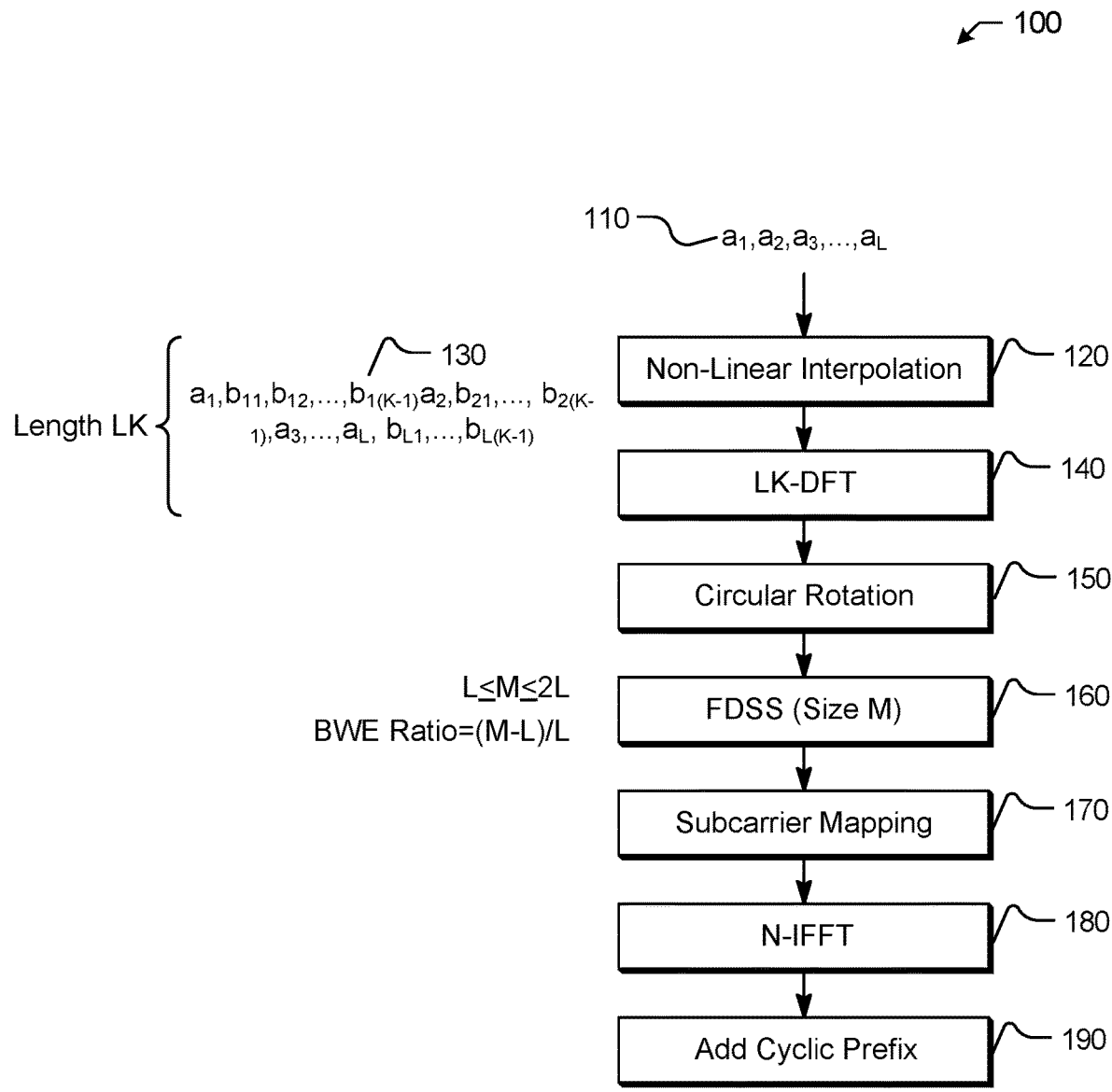
FIG. 1 illustrates an example block diagram for waveform generation.

Utilizing Phase Continuity for Generating Waveforms with Low Peak-to-Average Power Ratio In particular embodiments, a cellular system may harness the phase continuity factor to reduce the PAPR and at the same time reduce the ISI. The cellular system may generate a waveform that has better PAPR than ISI free FDSS-DFT-s-OFDM waveform and at the same time have similar bit-error-ratio (BER) performance. The disclosed embodiments may work for a range of bandwidth (BW) extension ratios and may be dynamically adjusted to get PAPR versus ISI trade-off. The waveform generated by the disclosed embodiments may have very low PAPR without compromising error performance. Although this disclosure describes generating waveforms with low PAPR by particular systems in a particular manner, this disclosure contemplates generating waveforms with low PAPR by any suitable system in any suitable manner.

In particular embodiments, a first wireless endpoint device may access a modulated symbol sequence comprising a plurality of symbols. The first wireless endpoint device may then generate, based on an unequal phase change method for any two adjacent symbols of the plurality of symbols, one or more interpolated symbols to be added between the two adjacent symbols. The first wireless endpoint device may then generate an interpolated symbol sequence based on adding the generated interpolated symbols for any two adjacent symbols into the two adjacent symbols. The first wireless endpoint device may further transmit, from the first wireless endpoint device, a waveform to a second wireless endpoint device. In particular embodiments, the waveform may be generated based on the interpolated symbol sequence.

Certain technical challenges exist for generating waveforms with low PAPR. One technical challenge may include effective nonlinear interpolation for generating waveform with low PAPR. The solution presented by the embodiments disclosed herein to address this challenge may be determining nonlinear interpolation based on a first condition that an absolute value of phase change accelerates from the adjacent symbol before the interpolated symbols to a median symbol of the interpolated symbols and a second condition that an absolute value of phase change decelerates from the median symbol of the interpolated symbols to the adjacent symbol after the interpolated symbols as these conditions may help create a PAPR versus ISI tradeoff, which may be further utilized by particularly designed functions for generating the waveform with low PAPR. Another technical challenge may include making the generated waveform meet the standardization requirements. The solution presented by the embodiments disclosed herein to address this challenge may be signaling some or all of the parameters by a transmitter to a receiver for agreement between the transmitter and the receiver as the agreed parameters may be used to generate or demodulate signals.

Certain embodiments disclosed herein may provide one or more technical advantages. A technical advantage of the embodiments may include significantly low PAPR compared to existing approaches including pulse shaped DFT-s-OFDM as the nonlinear interpolation functions disclosed herein satisfy different PAPR and ISI requirements. Another technical advantage of the embodiments may include comparable transmitter and receiver complexity to pulse shaped DFT-s-OFDM as the interpolation operation is transparent to the transmitter operation of waveform generation and receiver operation of waveform demodulation and the parameters may be signaled between the transmitter and the receiver. Another technical advantage of the embodiments may include minimal impact to current implementations complexity and hardware as the waveform generation may fit into the same DFT/IDFT implementation as OFDM and DFT-s-OFDM. Certain embodiments disclosed herein may provide none, some, or all of the above technical advantages. One or more other technical advantages may be readily apparent to one skilled in the art in view of the figures, descriptions, and claims of the present disclosure.

FIG. 1 illustrates an example block diagram 100 for waveform generation. In the following, the operation of each block is explained. In particular embodiments, the input for waveform generation may include a L-length modulated symbol sequence $a_1, a_2, \ldots, a_L$ 110. These symbols 110 may be generated from any constellation, which may include BPSK, $\pi/2$ BPSK, QPSK, or QAM. However, there may be no restriction on the signal constellation to be any one of these mentioned types, but in general they may be real, imaginary, or complex numbers. One such example may be Zad-off Chu sequence.

In particular embodiments, the unequal phase change method may comprise a nonlinear phase interpolation algorithm. The nonlinear interpolation 120 may first up-sample the input symbol sequence $a_1, a_2, a_3, \ldots, a_L$ 110 by the factor of K and nonlinearly interpolate the sequence to find the LK-length new symbol sequence $a_1, b_{11}, b_{12}, \ldots, b_{1(K-1)}, a_2, b_{21}, \ldots, b_{2(K-1)}, a_3, \ldots, a_L, b_{L1}, \ldots, b_{L(K-1)}$ 130. The newly added symbols may be denoted by the letter $b_{rk}$ where the subscript $r \in \{1, 2, \ldots, L\}$ denotes the fact that $b_{rk}$ is between $a_r$ and $a_{r+1}$. Further, the subscript k in $b_{rk}$ denotes the $k^{th}$ newly added symbol of the $r^{th}$ block. As an example and not by way of limitation, the $r^{th}$ block of the new symbol sequence 130 may be given by $a_r, b_{r1}, b_{r2}, \ldots, b_{rk}, b_{r(k+1)}, \ldots, b_{r(K-1)}a_{r+1}$. The LK-length sequence 130 may be considered circular such that for r=L, $a_{L+1}=a_1$ the sequence is $a_L, b_{L1}, b_{L2}, \ldots, b_{Lk}, b_{L(k+1)}, \ldots, b_{L(K-1)}a_1$.

There may be several conditions that may need to be satisfied for the newly added symbols $b_{rk}$ $\forall r \in \{1, \ldots, L\}$, $k \in \{1, \ldots, K-1\}$. In particular embodiments, generating the one or more interpolated symbols may be based on a first condition that an absolute value of phase change accelerates from the adjacent symbol before the interpolated symbols to a median symbol of the interpolated symbols and a second condition that an absolute value of phase change decelerates from the median symbol of the interpolated symbols to the adjacent symbol after the interpolated symbols. More specifically, the absolute value of phase change should be accelerated from k=1 to k=K/2 and from k=K−1 to k=K/2. That is:

$$|\phi(b_{rk}) - \phi(b_{r(k-1)})| \geq |\phi(b_{r(k-1)}) - \phi(b_{r(k-2)})| \quad 3 \leq k \leq \frac{K}{2} \quad (1)$$

$$|\phi(b_{rk}) - \phi(b_{r(k+1)})| \geq |\phi(b_{r(k+1)}) - \phi(b_{r(k+2)})| \quad \frac{K}{2} \leq k \leq K-3 \quad (2)$$

In here, $\phi(b_{rk})$ denotes the phase angle of the symbol $b_{rk}$ and $|\phi(b_{rk})|$ denotes the absolute value of $\phi(b_{rk})$. Moreover, at the boundary cases, it should satisfy:

$$|\phi(a_r) - \phi(b_{r1})| \leq |\phi(b_{rk}) - \phi(b_{r(k-1)})| \quad 2 \leq k \leq \frac{K}{2} \quad (3)$$

$$|\phi(a_{r+1}) - \phi(b_{r(K-1)})| \leq |\phi(b_{rk}) - \phi(b_{r(k-1)})| \quad \frac{K}{2} \leq k \leq K-1 \quad (4)$$

Based on these conditions, the absolute phase change between consecutive symbols from $a_r$ to $b_{rK/2}$ may accelerate. Similarly, the absolute phase change between consecutive symbols may decelerate from $b_{rK/2}$ to $a_{r+1}$. Determining nonlinear interpolation based on a first condition that an absolute value of phase change accelerates from the adjacent symbol before the interpolated symbols to a median symbol of the interpolated symbols and a second condition that an absolute value of phase change decelerates from the median symbol of the interpolated symbols to the adjacent symbol after the interpolated symbols may be an effective solution for addressing the technical challenge of effective nonlinear interpolation for generating waveform with low PAPR as these conditions may help create a PAPR versus ISI tradeoff, which may be further utilized by particularly designed functions for generating the waveform with low PAPR.

Figure 2:
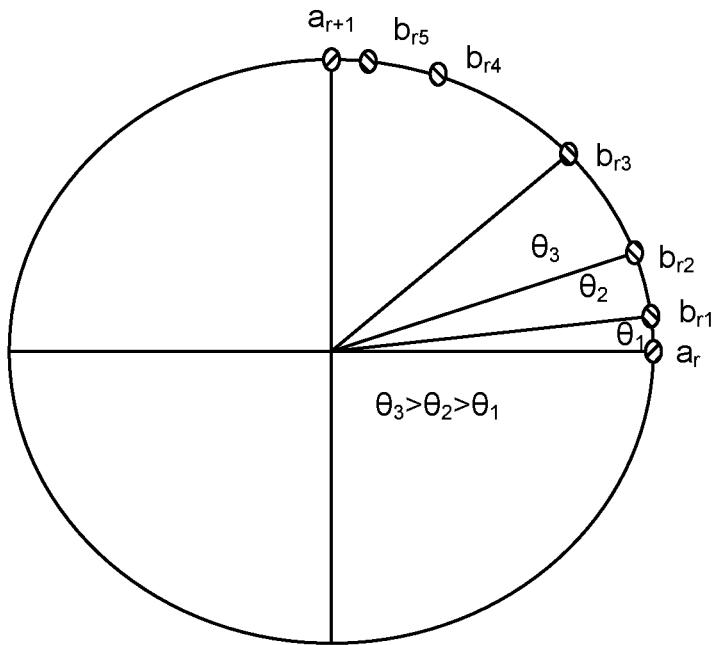
FIG. 2 illustrates example nonlinearly interpolated symbols of the $r^{th}$ block for K=6.
Figure 3:
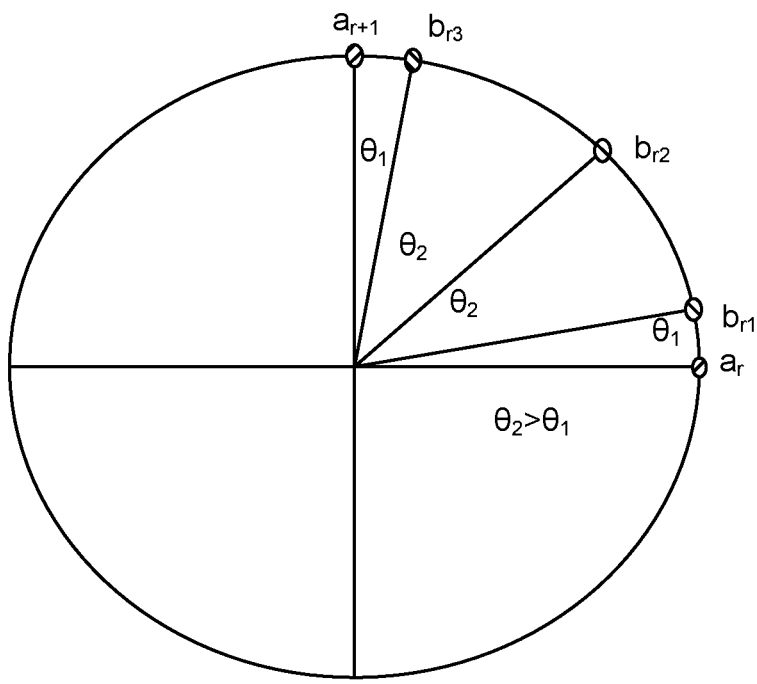
FIG. 3 illustrates example nonlinearly interpolated symbols of the block for symbols of the $r^{th}$ block for K=4.

FIG. 2 illustrates example nonlinearly interpolated symbols of the $r^{th}$ block for K=6. In here $\theta$ represents the phase different between symbols, e.g., $\theta_1 = |\phi(a_r) - \phi(b_{r1})|$. FIG. 2 shows the complex plane. Although in FIG. 2 it is shown as $a_r$ being real and $a_{r+1}$ being imaginary, they may lie anywhere in the complex plane in general. One may notice in FIG. 2 that the absolute phase change between consecutive symbols from $a_r$ to $b_{r3}$ accelerates, while the absolute phase change between consecutive symbols decelerates from $b_{r3}$ to $a_{r+1}$. FIG. 3 illustrates example nonlinearly interpolated symbols of the $r^{th}$ block for K=4. Observations similar to FIG. 2 may be obtained.

In particular embodiments, generating the one or more interpolated symbols may be based on an interpolation function. The interpolation function may be determined based on a tradeoff between peak-to-average power ratio (PAPR) and inter-symbol interference (ISI). The cellular system may select a phase interpolating function that optimizes the PAPR versus ISI trade-off. One such a function may be given by:

$$\phi(b_{rk}) = \begin{cases} \phi(a_r) + w_r(vk)^u, & 1 \leq k \leq \frac{K}{2} \\ \phi(a_{r+1}) - w_r(v(K-k))^u, & \frac{K}{2} \leq k \leq K-1 \end{cases} \quad (5)$$

In here, v is a constant that increases the phase linearly and the constant u changes the phase exponentially. The normalization factor $w_r$ is selected the normalize the phase. One example for the normalization factor may be:

$$w_r = \frac{[\phi(a_{r+1}) - \phi(a_r)]}{2} \left(\frac{vK}{2}\right)^{-u} \quad (6)$$

Such a selection may make phase interpolation function symmetric over K/2. Note that the phase change may be not a smooth function and there may be a phase discontinuity. If we assume phase variation is from 0 to $2\pi$ (radian), the phase $2\pi n+\psi$ may be equivalent to $0 \leq \psi < 2\pi$ for all integer values of n. This may pose practical challenges. Therefore, in general we assume $\phi(a_r)=2\pi n_r+\psi_r$ and $\phi(a_{r+1})=2\pi n_{r+1}+\psi_{r+1}$ where $n_r$ and $n_{r+1}$ are integers in general. In particular, they may take value of either 0 or 1. The value of $n_r$ may be set to either 0 or 1. Similarly the value of $n_{r+1}$ may be set to 0 or 1 to achieve desired properties. As an example and not by way of limitation, if $\psi_r=0$ and $\psi_{r+1}=3\pi/2$, we may fix $n_r=1$ and $n_{r+1}=0$.

Figure 4:
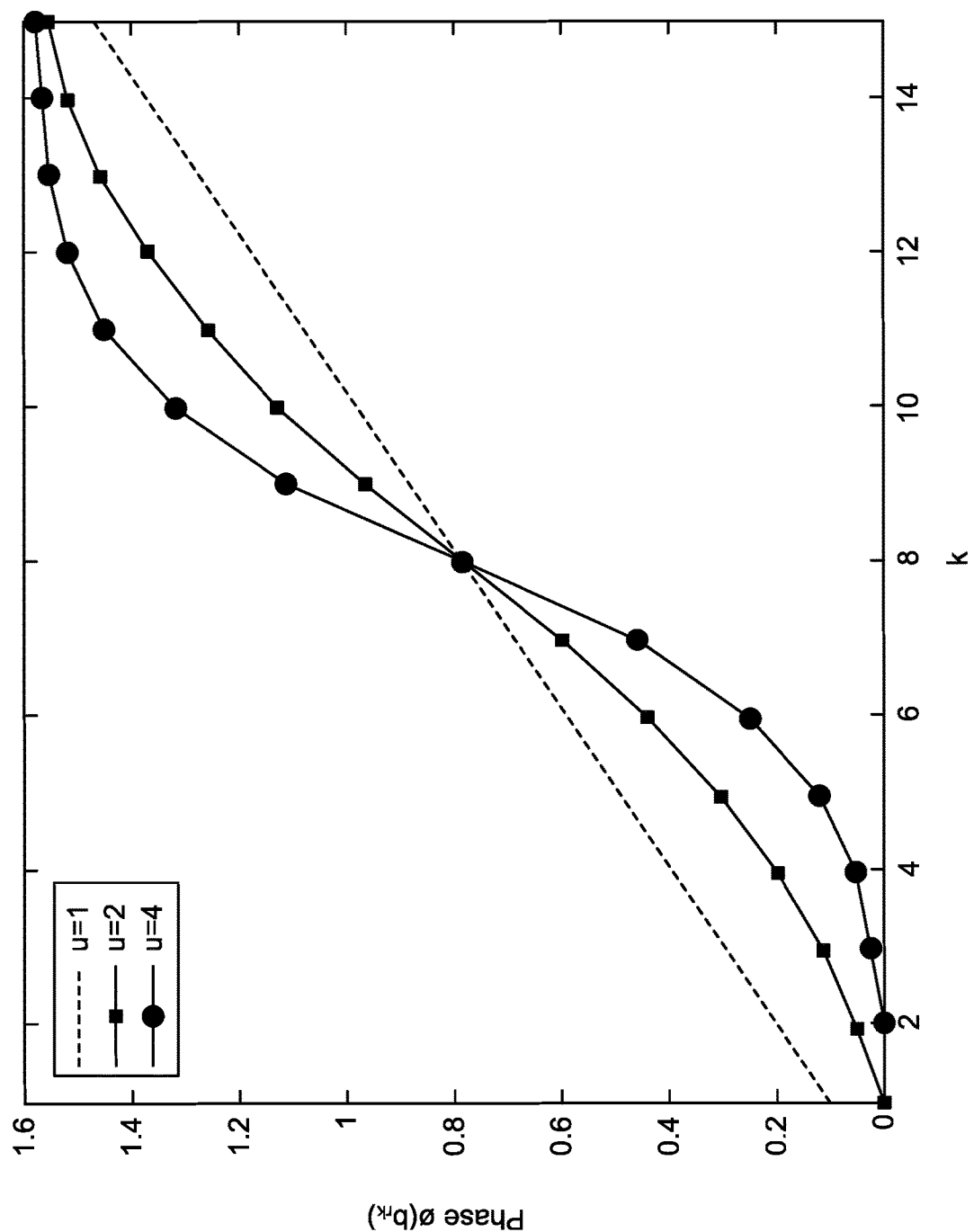
FIG. 4 illustrates an example phase interpolation function.

FIG. 4 illustrates an example phase interpolation function. In FIG. 4, phase change is shown for this phase interpolation function. In here, $\phi(a_r)=0$, $$\phi(a_{r+1}) = \frac{\pi}{2}\text{rad} \approx 1.57 \text{ rad},$$

K=16, and v=2 are assumed. In here, the rad stands for radian unit of angle. The phase change is shown for u=1, 2, and 3. It may be observed that for larger u the phase accelerates from k=1 to k=K/2 and from k=K−1 to k=K/2. Larger u may be preferred to reduce the ISI and smaller u may be preferred to reduce the PAPR. Therefore, in here, u may create a PAPR versus ISI tradeoff.

In particular embodiments, an alternative interpolation function may be given by:

$$\phi(b_{rk}) = \begin{cases} \phi(a_r) + w_r v^{ku}, & 1 \leq k \leq \frac{K}{2} \\ \phi(a_{r+1}) - w_r v^{u(K-k)}, & \frac{K}{2} \leq k \leq K-1 \end{cases} \quad (7)$$

In this case, the phase may exponentially vary with the index k. Further in here u, v may be constant and one choice for v may be Euler's number e. The normalizing factor $w_r$ may be selected to normalize the phase. One example for the normalization factor may be:

$$w_r = \frac{[\phi(a_{r+1}) - \phi(a_r)]}{2} v^{-\frac{uK}{2}} \quad (8)$$

In some embodiments, the phase difference between two consecutive input symbols may be different. In other words, any two consecutive symbols of the plurality of symbols may be associated with an absolute value of phase change, where two first consecutive symbols may be associated with a first absolute value of phase change and two second consecutive symbols may be associated with a second absolute value of phase change. The first absolute value of phase change and the second absolute value of phase change may be different. In this case, the interpolation function may be determined based on a consideration of the first absolute value of phase change and the second absolute value of phase change being different. As an example and not by way of limitation, in QPSK constellation, the phase change between two input symbols may be either $\pi/2$ or $\pi$. That is, $$|\phi(a_{r+1}) - \phi(a_r)| \in \left\{\frac{\pi}{2}, \pi\right\}.$$

This may cause different level of ISI for different phase changes. In the following embodiment, the interpolation function may be defined to mitigate this issue and reduce the effect of ISI.

Let this interpolation function be:

$$\phi(b_{rk}) = \begin{cases} \phi(a_r) + \overline{w}_r(vk)^u, & 1 \leq k < \frac{K}{2} \\ \phi(a_r) + w_r(vk)^u, & k = \frac{K}{2} \\ \phi(a_{r+1}) + \overline{w}_r(v(K-k))^u, & \frac{K}{2} < k \leq K-1 \end{cases} \quad (9)$$

In here, v is a constant that increases the phase linearly and the constant u changes the phase exponentially. One such normalization factor $w_r$ (for k=K/2) may be selected as:

$$w_r = \frac{[\phi(a_{r+1}) - \phi(a_r)]}{2} \left(\frac{vK}{2}\right)^{-u}. \quad (10)$$

Let $\epsilon$ be the smallest phase between input symbols. That is:

$$\epsilon = \min_{i,j} |a_i - a_j|. \quad (11)$$

Then, the second normalization factor $\overline{w}_r$ may be selected as:

$$\overline{w}_r = \frac{\epsilon \text{sign}[\phi(a_{r+1}) - \phi(a_r)]}{2} \left(\frac{vK}{2}\right)^{-u}, \quad (12)$$

where:

$$\text{sign}[\phi(a_{r+1}) - \phi(a_r)] = \begin{cases} 1, & [\phi(a_{r+1}) - \phi(a_r)] \geq 0 \\ -1, & [\phi(a_{r+1}) - \phi(a_r)] < 0 \end{cases}. \quad (13)$$

Alternative choices for the normalization factors may include:

$$w_r = \frac{[\phi(a_{r+1}) - \phi(a_r)]}{2} v^{-\frac{uK}{2}} \quad (14)$$

and $$\overline{w}_r = \frac{\epsilon \text{sign}[\phi(a_{r+1}) - \phi(a_r)]}{2} v^{-\frac{uK}{2}}. \quad (15)$$

In particular embodiments, the best parameters for the interpolation function may be determined based on the normalizing factor:

$$w_r = \frac{[\phi(a_{r+1}) - \phi(a_r)]}{2} \left(\frac{vK}{2}\right)^{-u}. \quad (16)$$

These parameters may be function of bandwidth expansion (BWE) factor. In here, $$BWE = \frac{M}{L} - 1.$$

Table 1 lists the values of these parameters for QPSK constellation.

TABLE 1

Example parameter values for QPSK constellation.

| BWE = M/L − 1 | u | v |
|---|---|---|
| 0.1 | u ≥ 20 | 2 |
| 0.2 | u ≥ 10 | 2 |
| 0.25 | u ≥ 6.5 | 2 |
| 0.3 | u ≥ 5.5 | 2 |

As a result, the embodiments disclosed herein may have a technical advantage of significantly low PAPR compared to existing approaches including pulse shaped DFT-s-OFDM as the nonlinear interpolation functions disclosed herein satisfy different PAPR and ISI requirements.

In particular embodiments, generating the waveform may comprise generating an output sequence in a frequency domain based on applying a discrete Fourier transform to the interpolated symbol sequence. Referring back to FIG. 1, the output of the nonlinear interpolation 120 may comprise LK symbol a sequence $a_1$, $b_{11}$, $b_{12}$, . . . , $b_{1(K-1)}a_2$, $b_{21}$, . . . , $b_{2(K-1)}$, $a_3$, . . . , $a_L b_{L1}$, . . . , $b_{L(K-1)}$ 130. During the nonlinear interpolation 120, LK-length discrete Fourier transform (LK-DFT) 140 may be performed on this symbol sequence 130 to output LK-length sequence in the frequency domain. This operation may be performed using fast Fourier transform (FFT) algorithm.

In particular embodiments, generating the waveform may further comprise generating a rotated sequence based on applying a circular rotation to the output sequence in the frequency domain. The circular rotation 150 may perform the circular rotation of the LK-length sequence or cyclic shift by a factor of C where C is a real valued constant. In particular embodiments, the cyclic rotation constant for QPSK may be $$C = \frac{L}{K} + 2$$

or $$C = 2.$$

In particular embodiments, generating the waveform may further comprise processing the rotated sequence. Processing the rotated sequence may comprise generating a spectral-shaped sequence based on applying a frequency domain spectral shaping (FDSS) algorithm to the rotated sequence. Referring back to FIG. 1, frequency domain spectral shaping (FDSS) 160 may be then performed. The input to FDSS 160 may comprise a LK sequence and let it be denoted by $s_1$, $s_2$, . . . , $s_{LK}$. FDSS 160 may first select M length middle sequence, that is, the elements $$\frac{LK}{2} - \frac{M}{2} + 1$$

to $$\frac{LK}{2} + \frac{M}{2}.$$

Therefore, the selected sequence may be $$S_{\frac{LK}{2} - \frac{M}{2} + 1}, S_{\frac{LK}{2} - \frac{M}{2} + 2}, \ldots, S_{\frac{LK}{2}}, S_{\frac{LK}{2} + 1}, \ldots, S_{\frac{LK}{2} + \frac{M}{2}}.$$

This M-length sequence may be multiplied element-by-element by the M-length spectral shaping pulse given by $f_1$, $f_2$, . . . , $f_M$. Therefore, the output of FDSS may comprise a M-length sequence. In particular embodiments, $f_l=1$ $\forall l \in \{1, M\}$ and in this case the output may be $$S_{\frac{LK}{2} - \frac{M}{2} + 1}, S_{\frac{LK}{2} - \frac{M}{2} + 2}, \ldots, S_{\frac{LK}{2}}, S_{\frac{LK}{2} + 1}, \ldots, S_{\frac{LK}{2} + \frac{M}{2}}.$$

In particular embodiments, processing the rotated sequence may further comprise mapping the spectral-shaped sequence from a first number of subcarriers to a second number of subcarriers. In subcarrier mapping 170, the input M sequence may be mapped to M subcarriers out of N subcarriers. One approach may be to map these subcarriers to be contiguous block of M subcarriers. In another approach, different mappings may be performed.

In particular embodiments, processing the rotated sequence may further comprise generating an output sequence in a time domain based on applying an inverse discrete Fourier transform (IDFT) with the second number of dimensions based on inverse fast Fourier transform to the mapped spectral-shaped sequence. Referring back to FIG. 1, N-IFFT 180 may then perform the N dimensional inverse discrete Fourier transform using IFFT. The embodiments disclosed herein may have a technical advantage of minimal impact to current implementations complexity and hardware as the waveform generation may fit into the same DFT/IDFT implementation as OFDM and DFT-s-OFDM. In particular embodiments, processing the rotated sequence may further comprise generating the waveform based on adding a cyclic prefix to the output sequence in the time domain. As illustrated in FIG. 1, the output of N-IFFT may be added with cyclic prefix 190.

The generated waveform may have a lower PAPR. The generated waveform may need standardization support such as 3GPP. This may be due to the fact that some parameters need to be agreed at the transmitter and the receiver. These parameters may include the input length L, the oversampling factor K, the allocated resource elements (REs) (subcarriers) M, and the phase interpolation function ϕ. In this disclosure, when the phase interpolation function ϕ is mentioned, it may represent a few parameters related to interpolated function such as parameter u in some embodiments.

There may be two alternative approaches where these parameters can be captured in the specification. In one approach, some parameters may be specified at the transmitter and the receiver, and the remaining parameters may be signaled. This approach may be useful to reduce the signaling overhead. In particular, interpolation function ϕ and the oversampling factor K may be specified, while the input length L and allocated REs M may be signaled. In another approach, all the parameters may be signaled. Signaling some or all of the parameters by a transmitter to a receiver for agreement between the transmitter and the receiver may be an effective solution for addressing the technical challenge of making the generated waveform meet the standardization requirements as the agreed parameters may be used to generate or demodulate signals.

Figure 5:
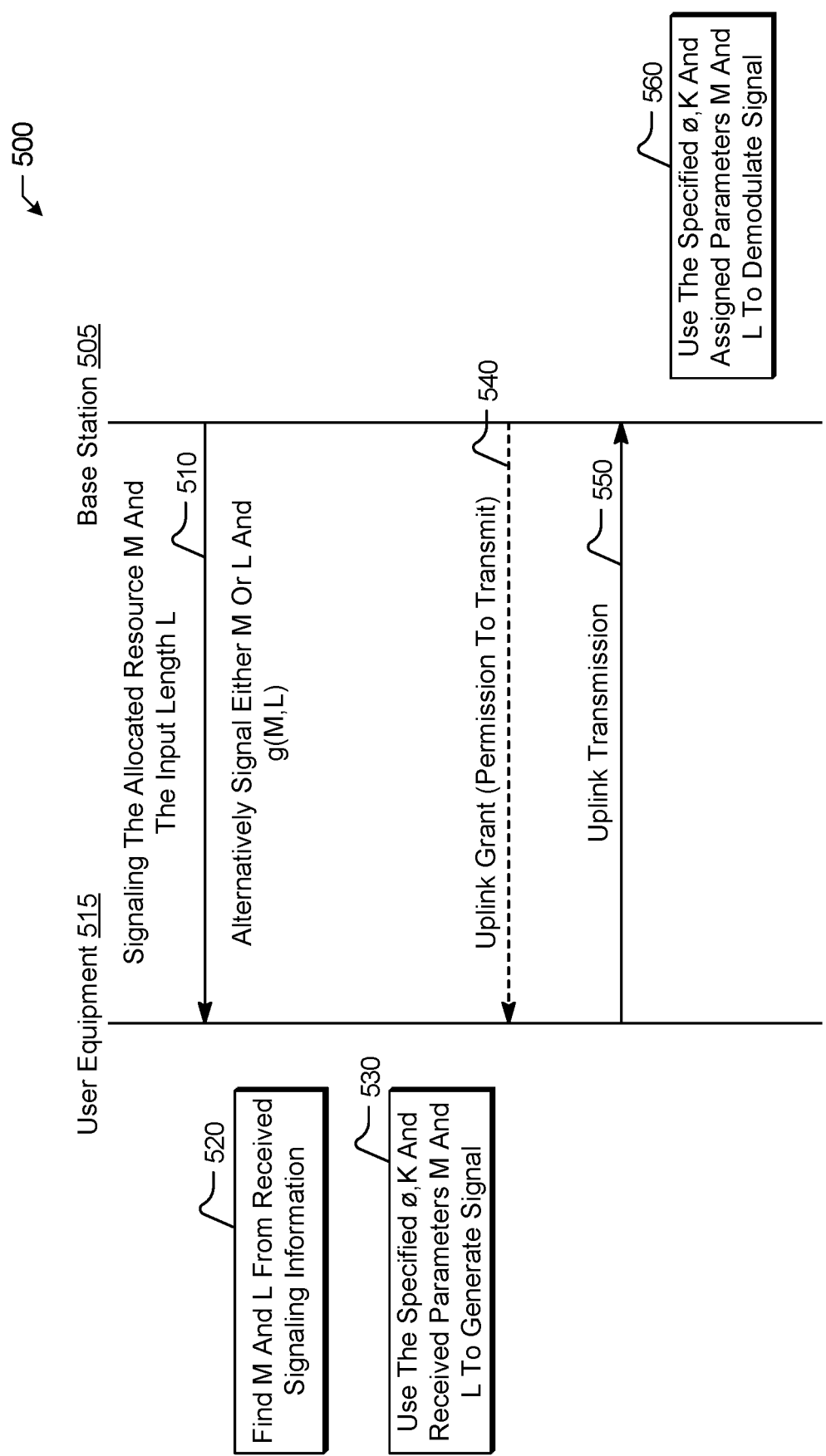
FIG. 5 illustrates an example signaling diagram for an uplink transmission.

In the uplink transmission, the user equipment (UE) may be the transmitter and the base station (BS) may be the receiver. FIG. 5 illustrates an example signaling diagram 500 for an uplink transmission. In this scenario, the first wireless endpoint device may comprise a user equipment and the second wireless endpoint device may comprise a base station. The signaling diagram 500 may be for the approach where some parameters are specified at the transmitter and the receiver, and the remaining parameters are signaled. In particular embodiments, the first wireless endpoint device may receive, at the first wireless endpoint device from the second wireless endpoint device, one or more of an allocated resource or a length of the modulated symbol sequence via a signaling channel. The first wireless endpoint device may then access, at the first wireless endpoint device, one or more of an interpolation function or an oversampling factor specified by the first wireless endpoint device. The first wireless endpoint device may further generate the waveform further based on one or more of the allocated resource, the length of the modulated symbol sequence, the interpolation function, or the oversampling factor. At step 510, the base station 505 may signal the allocated resource M and the input length L to the user equipment 515. Alternatively, the base station 505 may signal either L or M and g(M,L). At step 520, the user equipment 515 may find M and L from received signaling information. At step 530, the user equipment 515 may use the specified $\phi$, K and received parameters M and L to generate signal. At an optional step 540, the base station 505 may send uplink grant (permission to transmit) to the user equipment 515. At step 550, the user equipment 515 may send the uplink transmission to the base station 505. At step 560, the base station 505 may use the specified $\phi$, K and assigned parameters M and L to demodulate signal.

Figure 6:
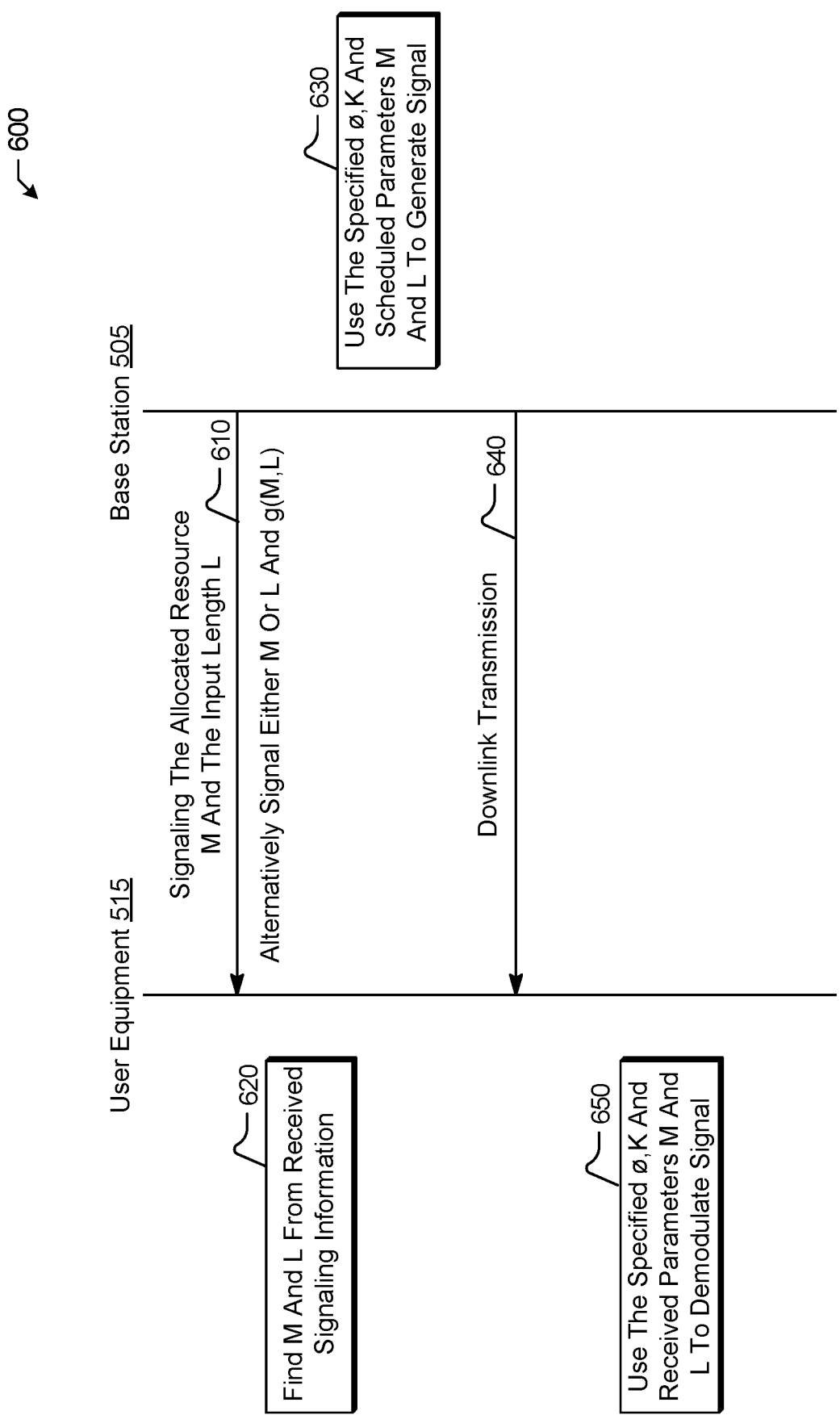
FIG. 6 illustrates an example signaling diagram for a downlink transmission.

FIG. 6 illustrates an example signaling diagram 600 for a downlink transmission. In this scenario, the first wireless endpoint device may comprise a base station and the second wireless endpoint device may comprise a user equipment. The signaling diagram 600 may be for the approach where some parameters are specified at the transmitter and the receiver, and the remaining parameters are signaled. In particular embodiments, the first wireless endpoint device may transmit, to the second wireless endpoint device, one or more of an allocated resource or a length of the modulated symbol sequence via a signaling channel. The first wireless endpoint device may further generate the waveform further based on one or more of the allocated resource, the length of the modulated symbol sequence, an interpolation function specified by the first wireless endpoint device, or an oversampling factor specified by the first wireless endpoint device. In the downlink transmission, the user equipment may be the receiver and the base station may be the transmitter. At step 610, the base station 505 may signal the allocated resource M and the input length L to the user equipment 515. Alternatively, the base station 505 may signal either L or M and g(M,L). At step 620, the user equipment 515 may find M and L from received signaling information. At step 630, the base station 505 may use the specified $\phi$, K and scheduled parameters M and L to generate signal. At step 640, the base station 505 may send the downlink transmission to the user equipment 515. At step 650, the user equipment 515 may use the specified $\phi$, K and received parameters M and L to demodulate signal.

In another approach, all parameters L, K, M, and $\phi$ may be signaled. In both of these aforementioned approaches, L and M may need to be signaled as they are tied to the allocated bandwidth and the allocated modulation and coding scheme (MCS). As the range of M and L may vary greatly, the signaling overhead may be reduced by signaling either L or M together with a function of g(M,L), which may have only few quantized values such that given L or M and g(M,L), it is possible to find both L and M. In the following, the impact is discussed for uplink and downlink.

Figure 7:
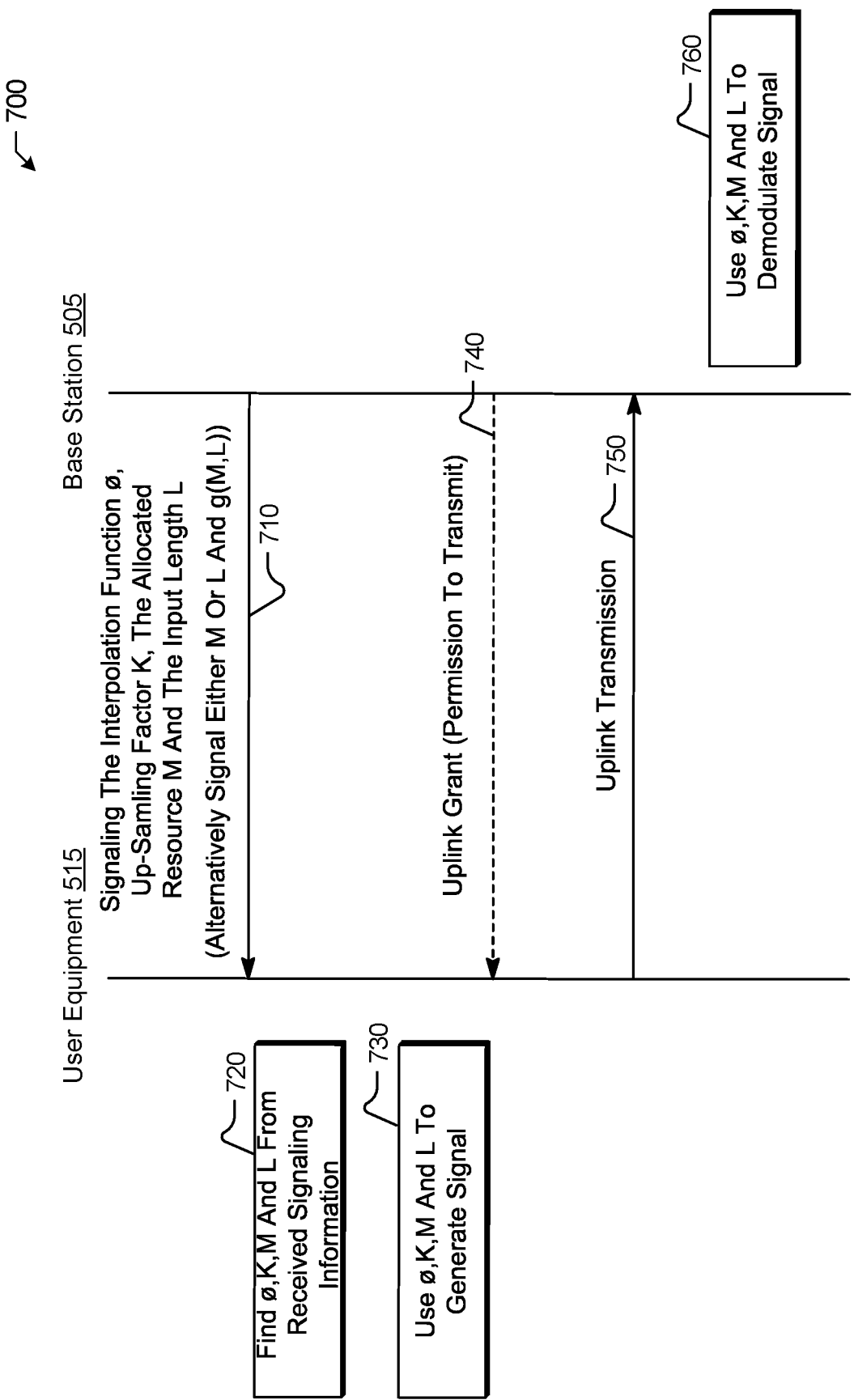
FIG. 7 illustrates another example signaling diagram for an uplink transmission.

FIG. 7 illustrates another example signaling diagram 700 for an uplink transmission. In this scenario, the first wireless endpoint device may comprise a user equipment and the second wireless endpoint device may comprise a base station. The signaling diagram 700 may be for the approach where all parameters are signaled. In particular embodiments, the first wireless endpoint device may receive, at the first wireless endpoint device from the second wireless endpoint device, one or more of an allocated resource, a length of the modulated symbol sequence, an interpolation function, or an oversampling factor via a signaling channel. The first wireless endpoint device may further generate the waveform further based on one or more of the allocated resource, the length of the modulated symbol sequence, the interpolation function, or the oversampling factor. At step 710, the base station 505 may signal the interpolation function $\phi$, up-sampling factor K, the allocated resource M and the input length L to the user equipment 515. Alternatively, the base station 505 may signal either L or M and g(M,L). At step 720, the user equipment 515 may find $\phi$, K, M and L from received signaling information. At step 730, the user equipment 515 may use $\phi$, K, M and L to generate signal. At an optional step 740, the base station 505 may send uplink grant (permission to transmit) to the user equipment 515. At step 750, the user equipment 515 may send the uplink transmission to the base station 505. At step 760, the base station 505 may use $\phi$, K, M and L to demodulate signal.

Figure 8:
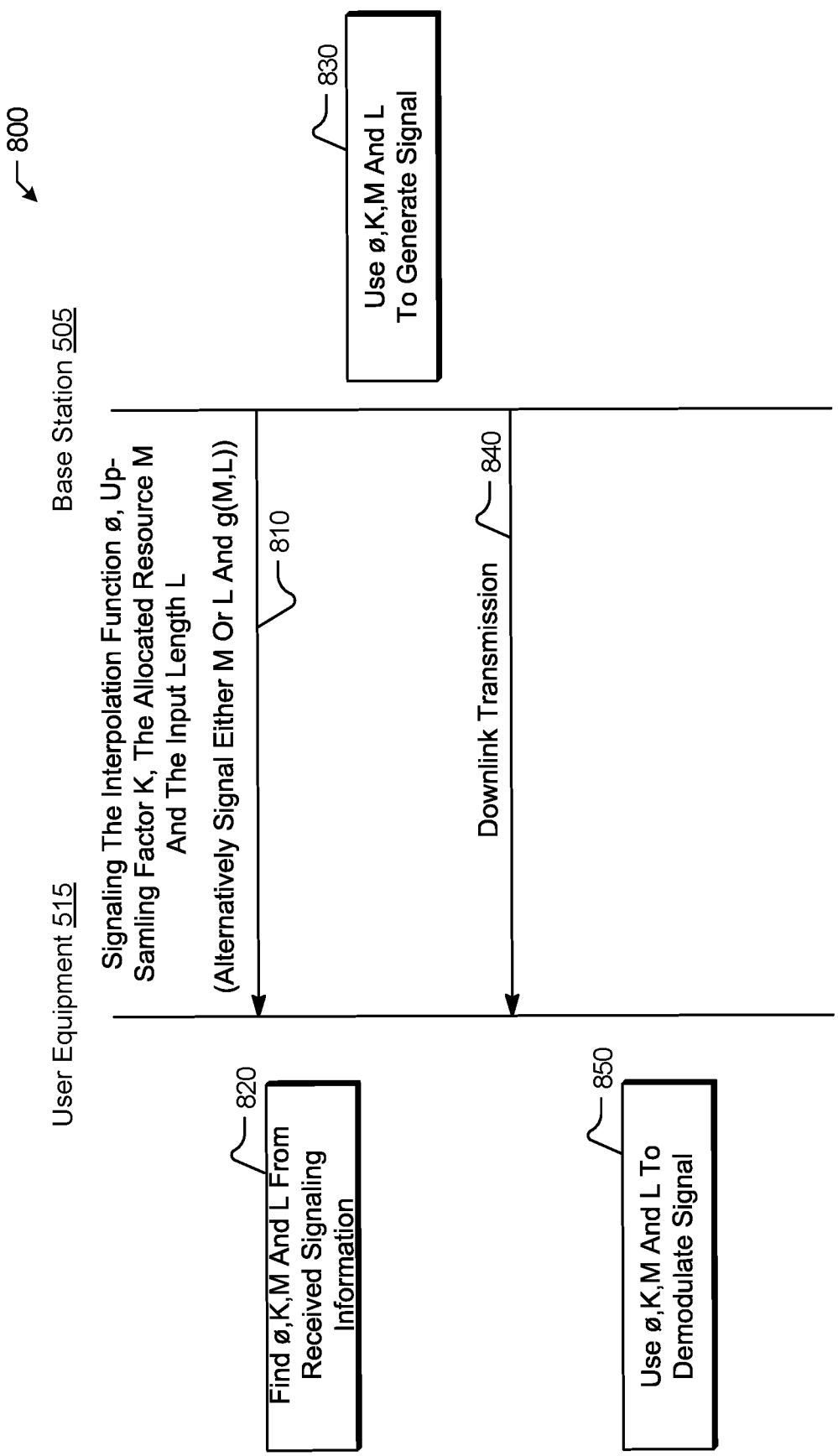
FIG. 8 illustrates another example signaling diagram for a downlink transmission.

FIG. 8 illustrates another example signaling diagram 800 for a downlink transmission. In this scenario, the first wireless endpoint device may comprise a base station and the second wireless endpoint device may comprise a user equipment. The signaling diagram 800 may be for the approach where all parameters are signaled. In particular embodiments, the first wireless endpoint device may transmit, to the second wireless endpoint device, one or more of an allocated resource, a length of the modulated symbol sequence, an interpolation function, or an oversampling factor via a signaling channel. The first wireless endpoint device may further generate the waveform further based on one or more of the allocated resource, the length of the modulated symbol sequence, the interpolation function, or the oversampling factor. At step 810, the base station 505 may signal the interpolation function $\phi$, up-sampling factor K, the allocated resource M and the input length L to the user equipment 515. Alternatively, the base station 505 may signal either L or M and g(M,L). At step 820, the user equipment 515 may find $\phi$, K, M and L from received signaling information. At step 830, the base station 505 may use the $\phi$, K, M and L to generate signal. At step 840, the base station 505 may send the downlink transmission to the user equipment 515. At step 850, the user equipment 515 may use $\phi$, K, M and L to demodulate signal.

Figure 9:
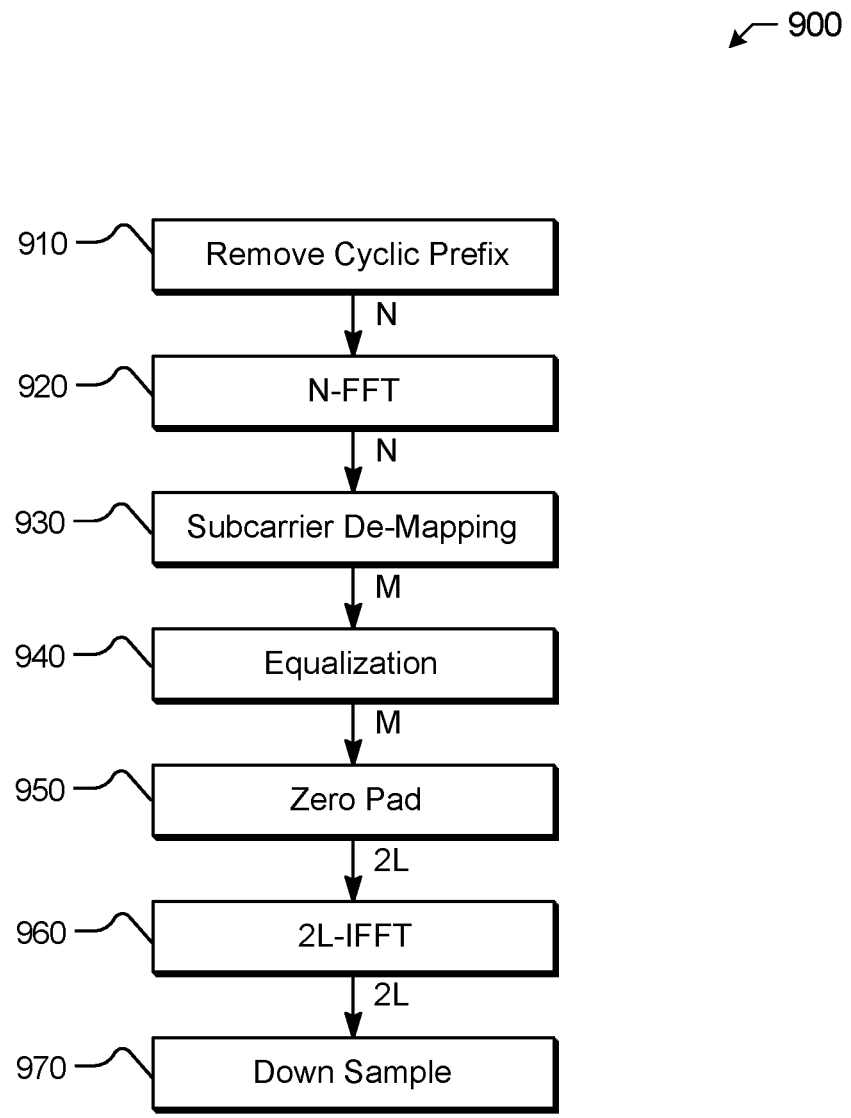
FIG. 9 illustrates an example block diagram for the receiver operation.

In particular embodiments, the receiver operation for the generated waveform may be as follows. FIG. 9 illustrates an example block diagram 900 for the receiver operation. At block 910, the cyclic prefix may be removed from the received baseband signal. Then N-FFT 920 may be taken to find the frequency-domain signal. The relevant subcarriers may be selected at the subcarrier de-mapping stage 930. The output of this stage may comprise a M-length signal in the frequency domain. In the next step 940, the channel may be equalized. After equalization, the M length may be zero padded with 2L–M zeros at step 950. This zero-pad operation 950 may be performed such that M signal sequence is centered at zero padded 2L length sequence. Next IFFT may be performed for the 2L sequence at block 960. At last, down sampling 970 may be performed to find the desired signal. The output of down sampling 970 may be an L sequence. One advantage of this approach may be that the interpolation operation is transparent, and the receiver requires the knowledge of parameters L and M. The embodiments disclosed herein may have a technical advantage of comparable transmitter and receiver complexity to pulse shaped DFT-s-OFDM as the interpolation operation is transparent to the transmitter operation of waveform generation and receiver operation of waveform demodulation and the parameters may be signaled between the transmitter and the receiver.

Figure 10:
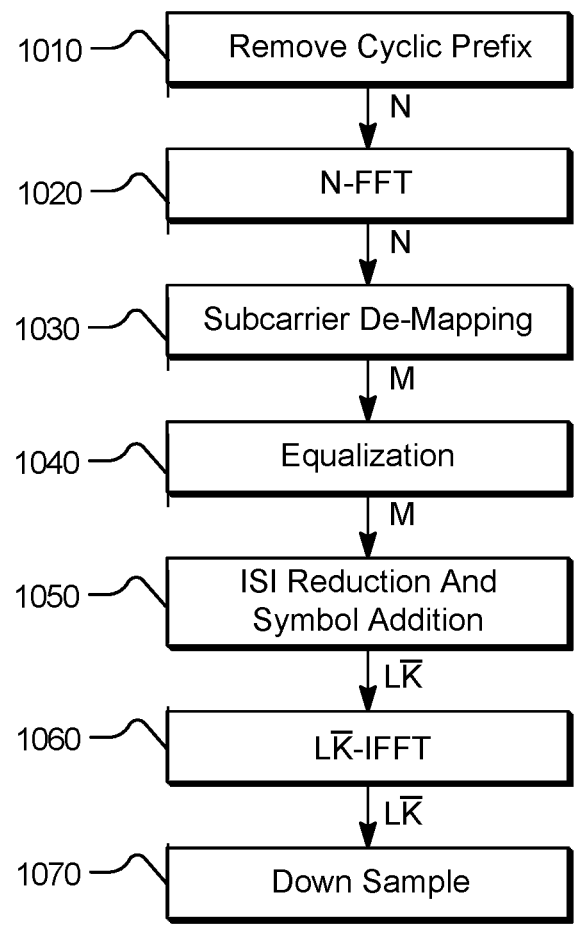
FIG. 10 illustrates another example block diagram for the receiver operation according to an alternative embodiment.

FIG. 10 illustrates another example block diagram 1000 for the receiver operation according to an alternative embodiment. The complexity of this receiver operation may be larger than the complexity of the receiver operation illustrated in FIG. 9. The receiver may require the parameters L, K, M, and φ to perform the receiver operation in FIG. 10. The operations till the equalization may be similar to those in FIG. 10, i.e., including removing cyclic prefix 1010, N-FFT 1020, subcarrier de-mapping 1030, and equalization 1040. After the equalization 1040, ISI reduction technique may be used and then new symbols may be added to M-length sequence to generate L$\bar{K}$-length sequence at block 1050. In here, 2≤$\bar{K}$≤K. Then L$\bar{K}$ IFFT 1060 may be performed and lastly downsampled by $\bar{K}$ at block 1070 to find the desired sequence, which may be an L sequence.

The embodiments disclosed herein further evaluated the link level performance for PAPR and bit error ratio (BER). The approach disclosed herein may create a PAPR versus ISI trade-off. Therefore, based on the bandwidth (BW) extension, one may find interpolation function that satisfies the different PAPR and ISI requirements. The embodiments disclosed herein generate simulations for QPSK constellation and π/2-BPSK. In the simulations, the interpolation function was found to limit the ICI such that there is no BER performance loss under un-coded scenario. Then, under this scenario (no BER loss), the best achievable PAPR is compared with prior art and is advantageous over the prior art.

Figure 11:
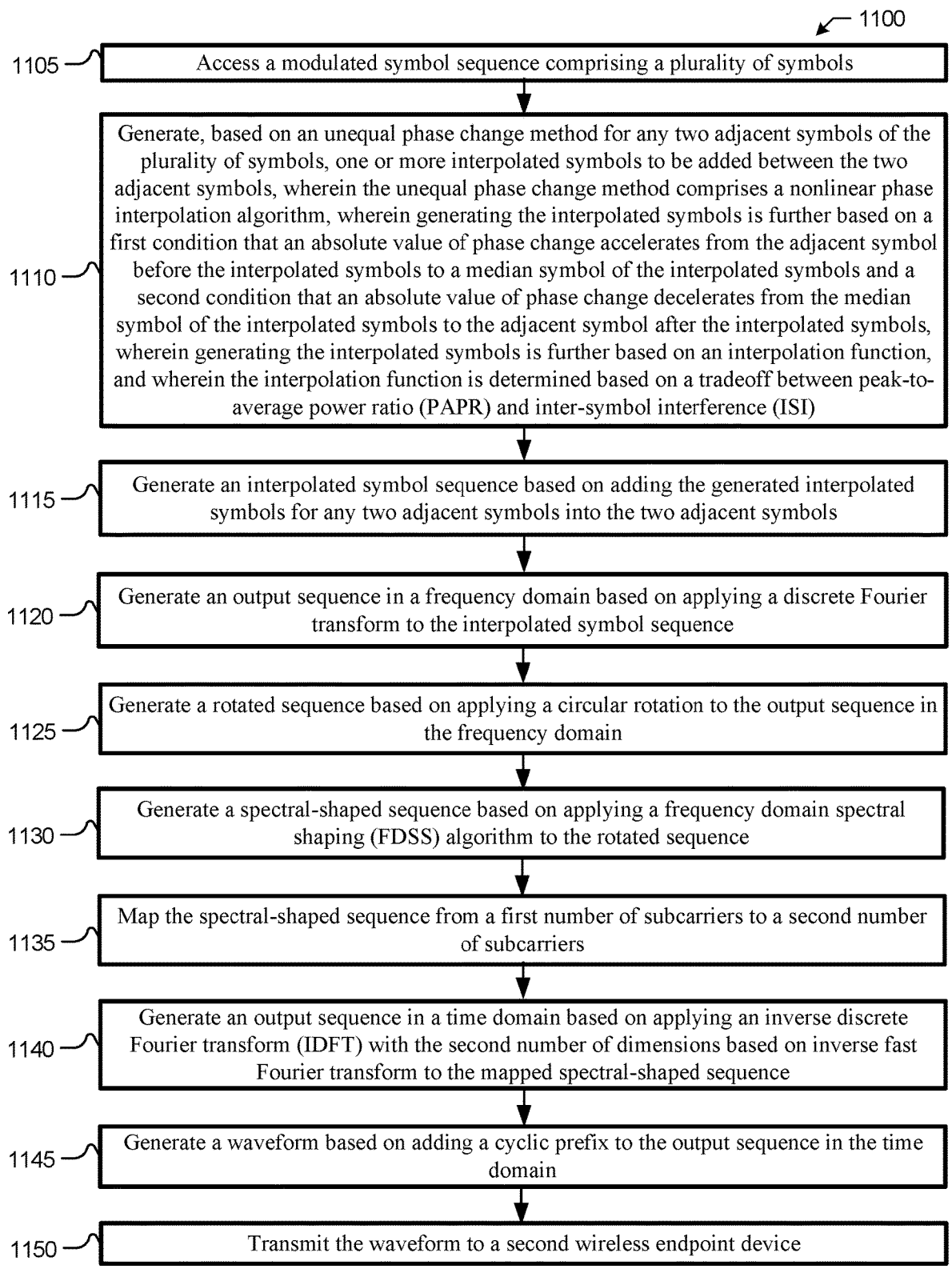
FIG. 11 illustrates is a flow diagram of a method for generating waveforms with low PAPR, in accordance with the presently disclosed embodiments.

FIG. 11 illustrates is a flow diagram of a method 1100 for generating waveforms with low PAPR, in accordance with the presently disclosed embodiments. The method 1100 may be performed utilizing one or more processing devices (e.g., a first wireless endpoint device) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 1100 may begin at step 1105 with the one or more processing devices (e.g., the first wireless endpoint device). For example, in particular embodiments, the first wireless endpoint device may access a modulated symbol sequence comprising a plurality of symbols. The method 1100 may then continue at step 1110 with the one or more processing devices (e.g., the first wireless endpoint device). For example, in particular embodiments, the first wireless endpoint device may generate, based on an unequal phase change method for any two adjacent symbols of the plurality of symbols, one or more interpolated symbols to be added between the two adjacent symbols, wherein the unequal phase change method comprises a nonlinear phase interpolation algorithm, wherein generating the interpolated symbols is further based on a first condition that an absolute value of phase change accelerates from the adjacent symbol before the interpolated symbols to a median symbol of the interpolated symbols and a second condition that an absolute value of phase change decelerates from the median symbol of the interpolated symbols to the adjacent symbol after the interpolated symbols, wherein generating the interpolated symbols is further based on an interpolation function, and wherein the interpolation function is determined based on a tradeoff between peak-to-average power ratio (PAPR) and inter-symbol interference (ISI). The method 1100 may then continue at step 1115 with the one or more processing devices (e.g., the first wireless endpoint device). For example, in particular embodiments, the first wireless endpoint device may generate an interpolated symbol sequence based on adding the generated interpolated symbols for any two adjacent symbols into the two adjacent symbols. The method 1100 may then continue at step 1120 with the one or more processing devices (e.g., the first wireless endpoint device). For example, in particular embodiments, the first wireless endpoint device may generate an output sequence in a frequency domain based on applying a discrete Fourier transform to the interpolated symbol sequence. The method 1100 may then continue at step 1125 with the one or more processing devices (e.g., the first wireless endpoint device). For example, in particular embodiments, the first wireless endpoint device may generate a rotated sequence based on applying a circular rotation to the output sequence in the frequency domain. The method 1100 may then continue at step 1130 with the one or more processing devices (e.g., the first wireless endpoint device). For example, in particular embodiments, the first wireless endpoint device may generate a spectral-shaped sequence based on applying a frequency domain spectral shaping (FDSS) algorithm to the rotated sequence. The method 1100 may then continue at step 1135 with the one or more processing devices (e.g., the first wireless endpoint device). For example, in particular embodiments, the first wireless endpoint device may map the spectral-shaped sequence from a first number of subcarriers to a second number of subcarriers. The method 1100 may then continue at step 1140 with the one or more processing devices (e.g., the first wireless endpoint device). For example, in particular embodiments, the first wireless endpoint device may generate an output sequence in a time domain based on applying an inverse discrete Fourier transform (IDFT) with the second number of dimensions based on inverse fast Fourier transform to the mapped spectral-shaped sequence. The method 1100 may then continue at step 1145 with the one or more processing devices (e.g., the first wireless endpoint device). For example, in particular embodiments, the first wireless endpoint device may generate a waveform based on adding a cyclic prefix to the output sequence in the time domain. The method 1100 may then continue at step 1150 with the one or more processing devices (e.g., the first wireless endpoint device). For example, in particular embodiments, the first wireless endpoint device may transmit the waveform to a second wireless endpoint device. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for generating waveforms with low PAPR including the particular steps of the method of FIG. 11, this disclosure contemplates any suitable method for generating waveforms with low PAPR including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Systems and Methods

Figure 12:
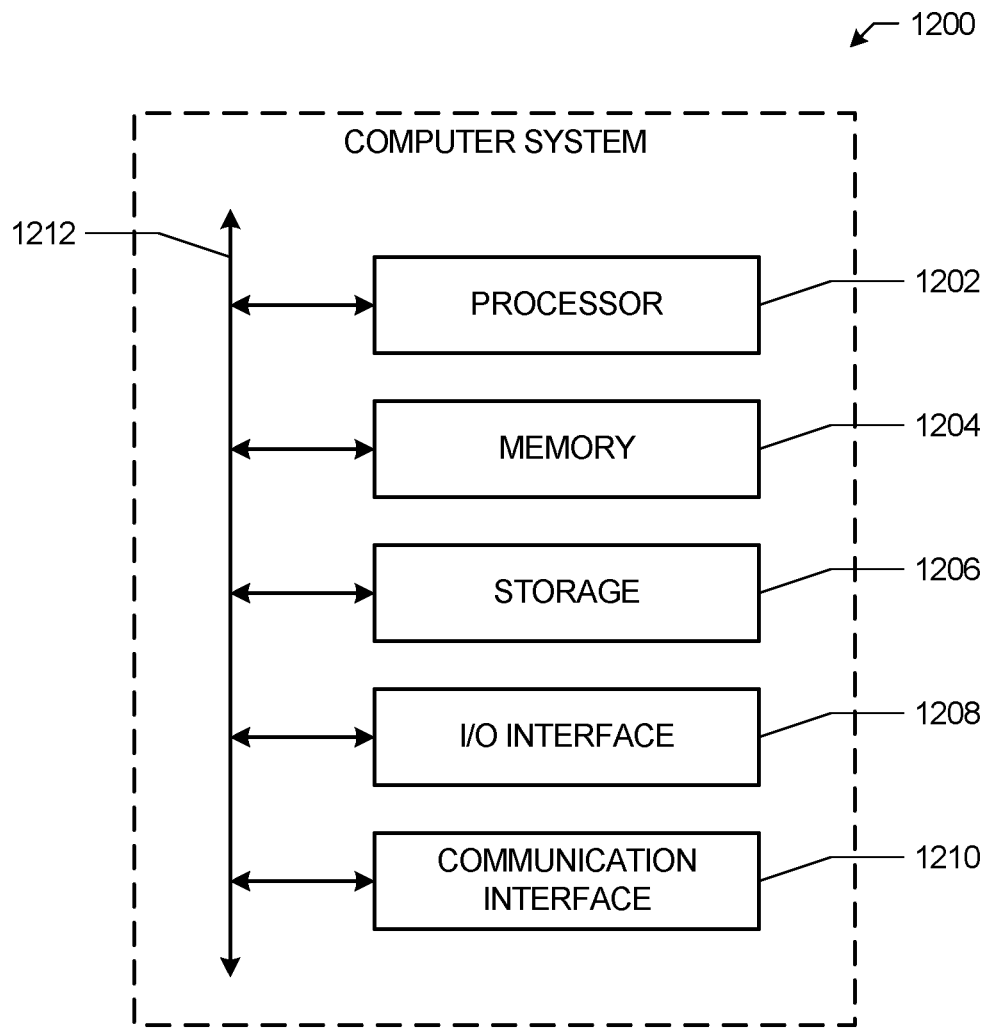
FIG. 12 illustrates an example computer system that may be utilized to generate waveforms with low PAPR, in accordance with the presently disclosed embodiments.

FIG. 12 illustrates an example computer system 1200 that may be utilized to perform automated control of smart appliances, in accordance with the presently disclosed embodiments. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks.

Where appropriate, one or more computer systems 1200 may perform without substantial spatial or temporal limitation one or more steps of one or more methods described or illustrated herein. As an example, and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement. In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202.

Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example, and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere).

One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memory devices, where appropriate. Although this disclosure describes and illustrates particular memory, this disclosure contemplates any suitable memory.

In particular embodiments, storage 1206 includes mass storage for data or instructions. As an example, and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it.

As an example, and not by way of limitation, computer system 1200 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example, and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a first wireless endpoint device:
    accessing a modulated symbol sequence comprising a plurality of symbols;
    generating, based on an unequal phase change method for any two adjacent symbols of the plurality of symbols, one or more interpolated symbols to be added between the two adjacent symbols, wherein a first phase change between a first adjacent symbol of the two adjacent symbols and a first interpolated symbol of the interpolated symbols and a second phase change between a second interpolated symbol of the interpolated symbols and the first interpolated symbol are unequal;
    generating an interpolated symbol sequence based on adding the generated interpolated symbols for any two adjacent symbols into the two adjacent symbols; and
    transmitting a waveform to a second wireless endpoint device, wherein the waveform is generated based on the interpolated symbol sequence.

2. The method of claim 1, wherein the unequal phase change method comprises a nonlinear phase interpolation algorithm.

3. The method of claim 1, wherein generating the waveform comprises:
    generating an output sequence in a frequency domain based on applying a discrete Fourier transform to the interpolated symbol sequence;
    generating a rotated sequence based on applying a circular rotation to the output sequence in the frequency domain; and
    processing the rotated sequence.

4. The method of claim 3, wherein processing the rotated sequence comprises:
    generating a spectral-shaped sequence based on applying a frequency domain spectral shaping (FDSS) algorithm to the rotated sequence;
    mapping the spectral-shaped sequence from a first number of subcarriers to a second number of subcarriers;
    generating an output sequence in a time domain based on applying an inverse discrete Fourier transform (IDFT) with the second number of subcarriers based on inverse fast Fourier transform to the mapped spectral-shaped sequence; and
    generating the waveform based on adding a cyclic prefix to the output sequence in the time domain.

5. The method of claim 1, wherein generating the one or more interpolated symbols is based on a first condition that an absolute value of phase change accelerates from the adjacent symbol before the interpolated symbols to a median symbol of the interpolated symbols and a second condition that an absolute value of phase change decelerates from the median symbol of the interpolated symbols to the adjacent symbol after the interpolated symbols.

6. The method of claim 1, wherein generating the one or more interpolated symbols is based on an interpolation function, and wherein the interpolation function is determined based on a tradeoff between peak-to-average power ratio (PAPR) and inter-symbol interference (ISI).

7. The method of claim 1, wherein generating the one or more interpolated symbols is based on an interpolation function, wherein any two consecutive symbols of the plurality of symbols is associated with an absolute value of phase change, wherein two first consecutive symbols is associated with a first absolute value of phase change and two second consecutive symbols is associated with a second absolute value of phase change, the first absolute value of phase change and the second absolute value of phase change being different, and wherein the interpolation function is determined based on a consideration of the first absolute value of phase change and the second absolute value of phase change being different.

8. The method of claim 1, wherein the first wireless endpoint device comprises a user equipment and the second wireless endpoint device comprises a base station, and wherein the method further comprises:
    receiving, at the first wireless endpoint device from the second wireless endpoint device, one or more of an allocated resource or a length of the modulated symbol sequence via a signaling channel;
    accessing, at the first wireless endpoint device, one or more of an interpolation function or an oversampling factor specified by the first wireless endpoint device; and generating the waveform further based on one or more of the allocated resource, the length of the modulated symbol sequence, the interpolation function, or the oversampling factor.

9. The method of claim 1, wherein the first wireless endpoint device comprises a user equipment and the second wireless endpoint device comprises a base station, and wherein the method further comprises:
receiving, at the first wireless endpoint device from the second wireless endpoint device, one or more of an allocated resource, a length of the modulated symbol sequence, an interpolation function, or an oversampling factor via a signaling channel; and
generating the waveform further based on one or more of the allocated resource, the length of the modulated symbol sequence, the interpolation function, or the oversampling factor.

10. The method of claim 1, wherein the first wireless endpoint device comprises a base station and the second wireless endpoint device comprises a user equipment, and wherein the method further comprises:
transmitting, to the second wireless endpoint device, one or more of an allocated resource or a length of the modulated symbol sequence via a signaling channel; and
generating the waveform further based on one or more of the allocated resource, the length of the modulated symbol sequence, an interpolation function specified by the first wireless endpoint device, or an oversampling factor specified by the first wireless endpoint device.

11. The method of claim 1, wherein the first wireless endpoint device comprises a base station and the second wireless endpoint device comprises a user equipment, and wherein the method further comprises:
transmitting, to the second wireless endpoint device, one or more of an allocated resource, a length of the modulated symbol sequence, an interpolation function, or an oversampling factor via a signaling channel; and
generating the waveform further based on one or more of the allocated resource, the length of the modulated symbol sequence, the interpolation function, or the oversampling factor.

12. An electronic device comprising:
a first wireless endpoint device;
one or more non-transitory computer-readable storage media including instructions; and
one or more processors coupled to the storage media, the one or more processors configured to execute the instructions to:
access a modulated symbol sequence comprising a plurality of symbols;
generate, based on an unequal phase change method for any two adjacent symbols of the plurality of symbols, one or more interpolated symbols to be added between the two adjacent symbols, wherein a first phase change between a first adjacent symbol of the two adjacent symbols and a first interpolated symbol of the interpolated symbols and a second phase change between a second interpolated symbol of the interpolated symbols and the first interpolated symbol are unequal;
generate an interpolated symbol sequence based on adding the generated interpolated symbols for any two adjacent symbols into the two adjacent symbols; and transmit a waveform to a second wireless endpoint device, wherein the waveform is generated based on the interpolated symbol sequence.

13. The electronic device of claim 12, wherein generating the waveform comprises:
generating an output sequence in a frequency domain based on applying a discrete Fourier transform to the interpolated symbol sequence;
generating a rotated sequence based on applying a circular rotation to the output sequence in the frequency domain; and
processing the rotated sequence.

14. The electronic device of claim 13, wherein processing the rotated sequence comprises:
generating a spectral-shaped sequence based on applying a frequency domain spectral shaping (FDSS) algorithm to the rotated sequence;
mapping the spectral-shaped sequence from a first number of subcarriers to a second number of subcarriers;
generating an output sequence in a time domain based on applying an inverse discrete Fourier transform (IDFT) with the second number of subcarriers based on inverse fast Fourier transform to the mapped spectral-shaped sequence; and
generating the waveform based on adding a cyclic prefix to the output sequence in the time domain.

15. The electronic device of claim 12, wherein generating the one or more interpolated symbols is based on a first condition that an absolute value of phase change accelerates from the adjacent symbol before the interpolated symbols to a median symbol of the interpolated symbols and a second condition that an absolute value of phase change decelerates from the median symbol of the interpolated symbols to the adjacent symbol after the interpolated symbols.

16. The electronic device of claim 12, wherein generating the one or more interpolated symbols is based on an interpolation function, and wherein the interpolation function is determined based on a tradeoff between peak-to-average power ratio (PAPR) and inter-symbol interference (ISI).

17. The electronic device of claim 12, wherein generating the one or more interpolated symbols is based on an interpolation function, wherein any two consecutive symbols of the plurality of symbols is associated with an absolute value of phase change, wherein two first consecutive symbols is associated with a first absolute value of phase change and two second consecutive symbols is associated with a second absolute value of phase change, the first absolute value of phase change and the second absolute value of phase change being different, and wherein the interpolation function is determined based on a consideration of the first absolute value of phase change and the second absolute value of phase change being different.

18. A computer-readable non-transitory storage media comprising instructions executable by a processor to:
access, by a first wireless endpoint device, a modulated symbol sequence comprising a plurality of symbols;
generate, by the first wireless endpoint device, based on an unequal phase change method for any two adjacent symbols of the plurality of symbols, one or more interpolated symbols to be added between the two adjacent symbols, wherein a first phase change between a first adjacent symbol of the two adjacent symbols and a first interpolated symbol of the interpolated symbols and a second phase change between a second interpolated symbol of the interpolated symbols and the first interpolated symbol are unequal;

generate, by the first wireless endpoint device, an interpolated symbol sequence based on adding the generated interpolated symbols for any two adjacent symbols into the two adjacent symbols; and transmit, from the first wireless endpoint device, a waveform to a second wireless endpoint device, wherein the waveform is generated based on the interpolated symbol sequence.

19. The media of claim 18, wherein generating the waveform comprises:

generating an output sequence in a frequency domain based on applying a discrete Fourier transform to the interpolated symbol sequence;

generating a rotated sequence based on applying a circular rotation to the output sequence in the frequency domain; and processing the rotated sequence.

20. The media of claim 19, wherein processing the rotated sequence comprises:

generating a spectral-shaped sequence based on applying a frequency domain spectral shaping (FDSS) algorithm to the rotated sequence;

mapping the spectral-shaped sequence from a first number of subcarriers to a second number of subcarriers;

generating an output sequence in a time domain based on applying a discrete Fourier transform with the second number of subcarriers based on inverse fast Fourier transform to the mapped spectral-shaped sequence; and generating the waveform based on adding a cyclic prefix to the output sequence in the time domain.

* * * * *